United States Patent
Ganjam et al.

(10) Patent No.: US 10,127,268 B2
(45) Date of Patent: Nov. 13, 2018

(54) REPAIRING DATA THROUGH DOMAIN KNOWLEDGE

(71) Applicant: Microsoft Technology Licensing, LLC, Redmond, WA (US)

(72) Inventors: Kris Kuppuswamy Ganjam, Seattle, WA (US); Yeye He, Redmond, WA (US); Anja Gruenheid, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 15/288,899

(22) Filed: Oct. 7, 2016

(65) Prior Publication Data

US 2018/0101561 A1     Apr. 12, 2018

(51) Int. Cl.
G06F 17/00     (2006.01)
G06F 17/30     (2006.01)

(52) U.S. Cl.
CPC .... G06F 17/30371 (2013.01); G06F 17/3053 (2013.01); G06F 17/3071 (2013.01); G06F 17/30303 (2013.01); G06F 17/30598 (2013.01)

(58) Field of Classification Search
CPC ......... G06F 17/30371; G06F 17/30303; G06F 17/3053; G06F 17/30598; G06F 17/3071
USPC ........................................................ 707/691
See application file for complete search history.

(56) References Cited

U.S. PATENT DOCUMENTS

| | | | |
|---|---|---|---|
| 7,296,011 B2 * | 11/2007 | Chaudhuri | G06F 17/30542 |
| 7,499,934 B2 * | 3/2009 | Zhang | G06F 17/30728 |
| 8,032,546 B2 * | 10/2011 | Arasu | G06F 17/30569 707/769 |
| 8,812,411 B2 | 8/2014 | Malka et al. | |
| 9,037,589 B2 * | 5/2015 | Anderson | G06F 17/30286 707/737 |
| 9,679,049 B2 * | 6/2017 | Knight | G06F 17/30713 |
| 2004/0249789 A1 * | 12/2004 | Kapoor | G06F 17/30303 |
| 2005/0055365 A1 | 3/2005 | Ramakrishnan et al. | |
| 2011/0173222 A1 | 7/2011 | Sayal et al. | |
| 2012/0089614 A1 | 4/2012 | Hamilton | |

(Continued)

FOREIGN PATENT DOCUMENTS

| | | | |
|---|---|---|---|
| CN | 101986296 B | 4/2012 | |
| WO | WO 2013/074781 | * 5/2013 | G06F 17/30 |

OTHER PUBLICATIONS

Schallehn, Eike, et al., "Efficient similarity-based operations for data integration", Data Knowledge & Engineering, vol. 48, Issue 3, Mar. 2004, pp. 361-387.*

(Continued)

*Primary Examiner* — Robert Stevens
(74) *Attorney, Agent, or Firm* — Workman Nydegger

(57) ABSTRACT

Correcting data in a dataset. A set of data tokens from a tabular data store are grouped into a plurality of different clusters based on similarity of tokens. A reference cluster is selected from among the plurality of different clusters such that the plurality of clusters includes a reference cluster and one or more other clusters, one or more tokens in the one or more other clusters are transformed. Transforming tokens is performed based on a cost of transforming tokens. The effect on the reference cluster of adding the transformed tokens to the reference cluster is determined. Using this information, a correction for a token in the dataset is identified. The data store is updated to correct the token.

20 Claims, 7 Drawing Sheets

(56) References Cited

U.S. PATENT DOCUMENTS

| | | |
|---|---|---|
| 2012/0303555 A1 | 11/2012 | Yakout et al. |
| 2015/0278241 A1 | 10/2015 | Bates-Haus et al. |
| 2015/0379051 A1 | 12/2015 | Tang et al. |
| 2016/0092474 A1* | 3/2016 | Stojanovic .......... G06F 3/04842 707/805 |
| 2016/0092557 A1* | 3/2016 | Stojanovic ........ G06F 17/30554 707/723 |
| 2018/0074786 A1* | 3/2018 | Oberbreckling .......... G06F 7/02 |
| 2018/0075104 A1* | 3/2018 | Oberbreckling .. G06F 17/30498 |

OTHER PUBLICATIONS

Zaidi, et al., "Improve Data Quality by Processing Null Values and Semantic Dependencies", In Journal of Computer and Communications, May 26, 2016, pp. 79-86.

Faleiros, et al., "Bipartite graph for topic extraction", In Proceedings of 24th International Joint Conference on Artificial Intelligence, Jul. 2015, pp. 4361-4362.

"Data Quality Services", Published on: Jun. 2012. SQL Server 2012 Books Online, Microsoft Corp., 99 pages.

Martins, et al., "Semantic Similarity Match for Data Quality", In Technical Report DI-FCUL TR-07-25, Nov. 2007, 17 pages.

Arasu, et al., "Data Cleaning", Retrieved on: Jul. 22, 2016 Available at: https://www.microsoft.com/en-us/research/project/data-cleaning/, 8 pages.

Kandel, et al., "Enterprise data analysis and visualization: An interview study", In Journal of IEEE Transactions on Visualization and Computer Graphics, vol. 18, Issue 12, Dec. 2012, pp. 2917-2926.

Stonebraker, et al., "Data Curation at Scale: The Data Tamer System", In Proceedings of 6th Biennial Conference on Innovative Data Systems Research, Jan. 6, 2013, 10 pages.

Kandel, et al., "Wrangler: interactive visual specification of data transformation scripts", In Proceedings of the SIGCHI Conference on Human Factors in Computing Systems, May 7, 2011, pp. 3363-3372.

Haas, et al., "Wisteria: Nurturing scalable data cleaning infrastructure", In Proceedings of the VLDB Endowment, vol. 8, Issue 12, Aug. 2015, pp. 2004-2007.

Bohannon, et al., "Conditional functional dependencies for data cleaning", In Proceedings of IEEE 23rd International Conference on Data Engineering, Apr. 15, 2007, pp. 746-755.

Chu, et al., "TEGRA: table extraction by global record alignment", In Proceedings of the ACM SIGMOD International Conference on Management of Data, May 31, 2015, pp. 1713-1728.

Cruys, Tim Van De, "Two multivariate generalizations of pointwise mutual information", In Proceedings of the Workshop on Distributional Semantics and Compositionality, Jun. 24, 2011, pp. 16-20.

Hassanzadeh, et al.,"Framework for evaluating clustering algorithms in duplicate detection", In Proceedings of the VLDB Endowment, vol. 2, Issue 1, Aug. 24, 2009, pp. 1282-1293.

Michalski, et al., "Machine Learning: An Artificial Intelligence Approach", In Publication of Springer, Retrieved on: Aug. 4, 2016, 266 pages.

Hodge, et al., "A survey of outlier detection methodologies", In Journal of Artificial Intelligence Review, vol. 22, Issue 2, Oct. 2004, pp. 85-126.

Bansal, et al., "Correlation clustering", In Journal of Machine Learning, vol. 56, Issue 1-3, Jun. 25, 2004, 11 pages.

Cutting, et al., "Scatter/gather: A cluster-based approach to browsing large document collections", In Proceedings of the 15th annual international ACM SIGIR conference on Research and development in information retrieval, Jun. 1, 1992, pp. 318-329.

Bouma, Gerlof, "Normalized (pointwise) mutual information in collocation extraction", In Proceedings of Biennial GSCL Conference, Sep. 30, 2009, 11 pages.

Elmagarmid, et al., "Duplicate Record Detection: A Survey", In Journal of IEEE Transactions on Knowledge and Data Engineering, vol. 19, Issue 1, Jan. 2007, pp. 1-16.

Cong, et al., "Improving data quality: Consistency and accuracy" In Proceedings of the 33rd international conference on Very large data bases, Sep. 23, 2007, pp. 315-326.

Chiang, et al., "A unified model for data and constraint repair", In Proceedings of IEEE 27th International Conference on Data Engineering, Apr. 11, 2011, pp. 446-457.

Yakout, et al., "Guided data repair", In Proceedings of the VLDB Endowment, vol. 4, Issue 5, Aug. 29, 2011, pp. 279-289.

Kandel, et al., "Research directions in data wrangling: Visualizations and transformations for usable and credible data", In Journal of Information Visualization—Special issue on State of the Field and New Research Directions, vol. 10, Issue 4, Oct. 2011, pp. 1-18.

Fan, et al., "Interaction between record matching and data repairing", In ACM Journal of Data and Information Quality, vol. 4, Issue 4, May 2014, 38 pages.

He, et al., "SEMA-JOIN: joining semantically-related tables using big table corpora", In Proceedings of the VLDB Endowment, vol. 8, Issue 12, Aug. 2015, pp. 1358-1369.

Altman, N. S., "An introduction to kernel and nearest neighbor nonparametric regression", In Journal of the American Statistician, vol. 46, Jun. 1991, 32 pages.

Hautamaki, et al., "Outlier detection using k-nearest neighbour graph", In Proceedings of the 17th International Conference on Pattern Recognition, vol. 3, Aug. 23, 2004, 4 pages.

Schubert, et al., "Fast and scalable outlier detection with approximate nearest neighbor ensembles", In Proceedings of 20th International Conference on Database Systems for Advanced Applications, vol. 2, Apr. 20, 2015, 17 pages.

Abe, et al., "Outlier detection by active learning", In Proceedings of the 12th ACM SIGKDD international conference on Knowledge discovery and data mining, Aug. 20, 2006, pp. 504-509.

Wang, et al., "Expansion of Tail Concept Using Web Tables", In TechReport MSR-TR-2014-143, Nov. 11, 2014 pp. 1-29.

"International Search Report and Written Opinion Issued in PCT Application No. PCT/US2017/054206", dated Dec. 8, 2017, 12 Pages.

* cited by examiner

REPAIRING DATA THROUGH DOMAIN KNOWLEDGE

BACKGROUND

Background and Relevant Art

Computers and computing systems have affected nearly every aspect of modern living. Computers are generally involved in work, recreation, healthcare, transportation, entertainment, household management, etc.

Data used in computing systems often comes from different sources and may contain a number of types of errors and inconsistencies including: spelling mistakes, abbreviations mixed with full words, extra or missing data, anomalous/incorrect data, data missing entirely, different conventions, syntactic transformations and semantic synonyms. However, it may be useful to have data to not include errors and to be consistent. The results of data processing are improved when this is the case.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method of correcting data in a dataset. The method includes grouping a set of data tokens from a tabular data store into a plurality of different clusters based on similarity of tokens. The method further includes selecting a reference cluster from among the plurality of different clusters such that the plurality of clusters includes a reference cluster and one or more other clusters, one or more tokens in the one or more other clusters are transformed. Transforming tokens is performed based on a cost of transforming tokens. The effect on the reference cluster of adding the transformed tokens to the reference cluster is determined. Using this information, a correction for a token in the dataset is identified. The data store is updated to correct the token.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein may include a system for context-sensitive repair and standardization of one or more columns of textual or categorical data. The system leverages a corpus of structured background data (such as data from one or more websites, databases, and/or other sources) to build necessary statistics and error-correction models and applies novel clustering and graph matching processes during the online repair process. Embodiments thus, can use a large corpus of structured background data processed in an offline phase to clean, repair and standardize user data in an online phase.

Embodiments use the notion of domain similarity This semantic knowledge can be used in combination with syntactic similarity measures to identify repair candidates relevant for those values that do not fit the domain.

Leveraging columnar semantics independent of the given context allows approaches to data repairs to be applicable in a broader variety of use cases. For example, embodiments may be able to repair a second column in a table without knowing that there exist other columns in the table. This is especially useful for on-the-fly corrections of enumerations, spreadsheets, etc.

To realize this independence of contextual data, embodiments identify domains, i.e., semantic value sets in a reference corpus of column data. These domains are then leveraged to identify outliers within the columns (e.g., tokens that not found in a domain in which other tokens in the columns are found) that need to be repaired and to propose repairs for those outliers (or to automatically repair those outliers). For example, for a set of tokens, most of the tokens can be grouped into a cluster corresponding to a single domain, but one or more of the tokens in the set of tokens cannot be grouped into the cluster, because they do not appear in the domain, and thus must be grouped into a different cluster corresponding to a different domain.

Figure 1:
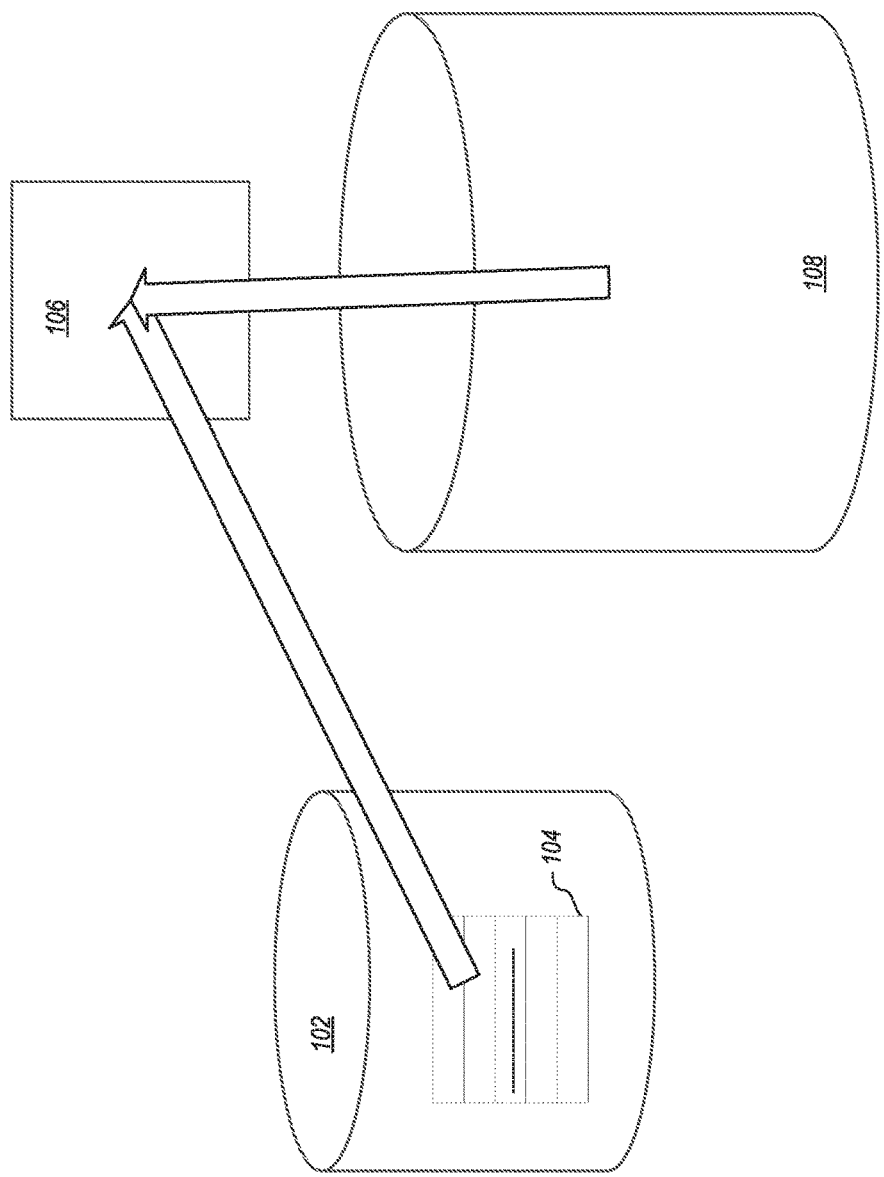
FIG. 1 illustrates a processing system for correcting errors in a data store.

FIG. 1 illustrates a data store 102. The data store includes columns of tabular data 104. A processing system 106 can obtain the tabular data 104 and group data items in the tabular data 104 into clusters. This can be done based on analysis of a corpus of background data 108 where the background data is grouped into clusters as will be illustrated in more detail below. Typically, this results in one cluster having a large number of data items (which is selected as a reference cluster), and one or more smaller clusters having a smaller number of data items (in a best case scenario, only a single data item in each smaller cluster). The processing system 106 can then determine various transformations of the data items in the smaller clusters that would allow the data items to be included in the reference cluster. The processing system 106 can propose the transformations as repairs to the data items in the smaller clusters.

Figure 2:
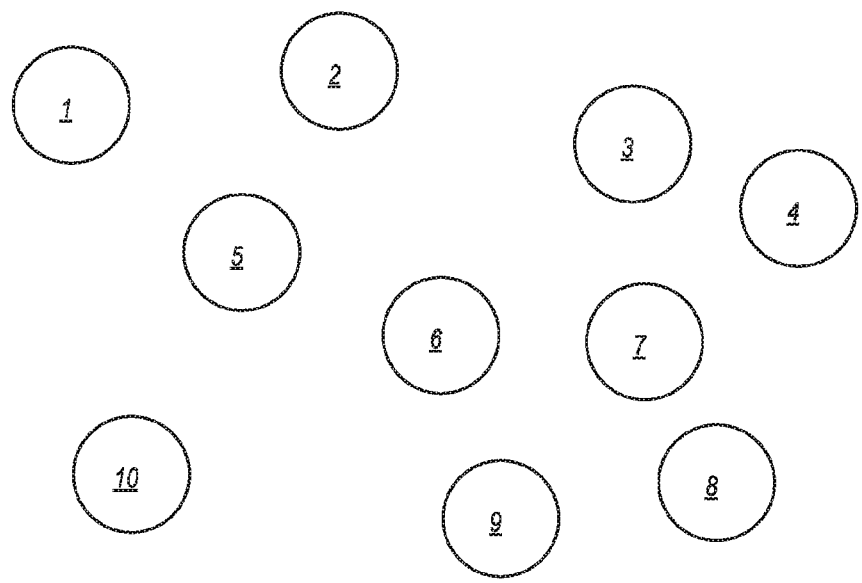
FIG. 2 illustrates a set of data items illustrated as tokens.
Figure 3:
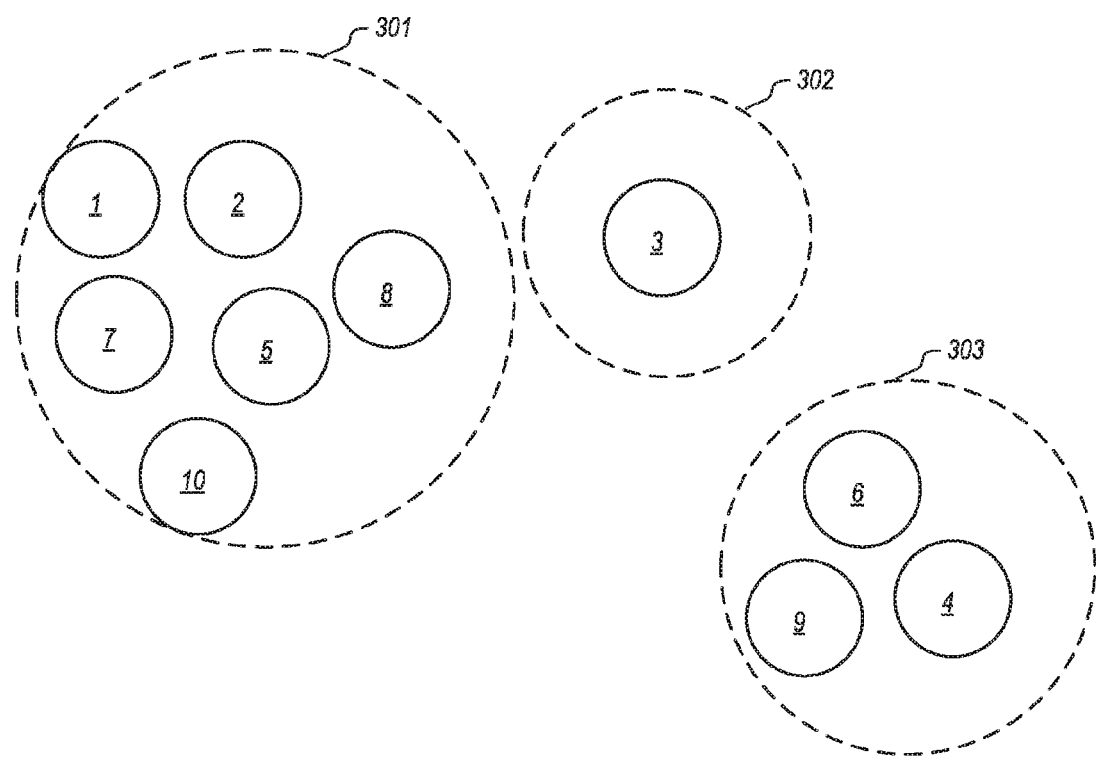
FIG. 3 illustrates the tokens grouped into clusters.
Figure 4A:
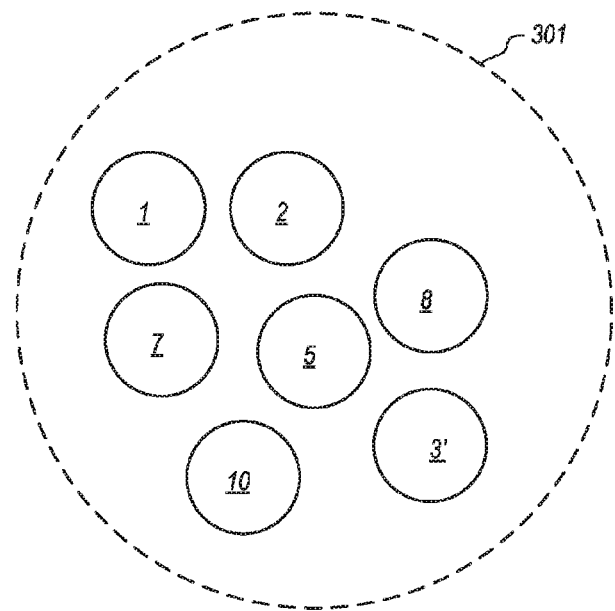
FIG. 4A illustrates the results of adding a transformed token to a reference cluster.
Figure 4B:
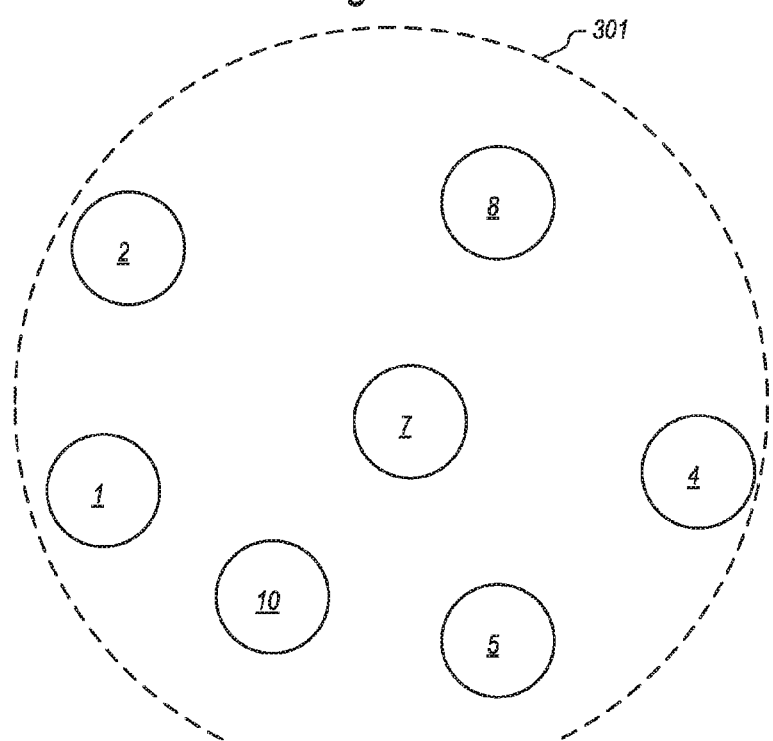
FIG. 4B illustrates another example of the results of adding a transformed token to a reference cluster.

A basic example is illustrated in FIGS. 2 through 4. FIG. 2 illustrates a set of data items illustrated as tokens 1-10. The tokens 1-10 can be organized into different clusters based on domains of a corpus of background data, as illustrated in FIG. 3, where three clusters 301, 302 and 303 are illustrated. The clusters are organized, in the example, based on edge density between tokens taken as a cluster, i.e., cluster similarity. A cluster 301 is selected as a reference cluster. Tokens in the other clusters (i.e., clusters 302 and 303) are transformed according to some cost computation. For example, a token may be transformed based on the Levenshtein distance from the original token prior to the transformation to the transformed token after the transformation. Thus, in the illustrated example, token 3 is transformed into token 3' and token 4 is transformed into token 4' (as illustrated in FIGS. 4A and 4B).

The transformed tokens are added to the reference cluster 101 and the effect of adding the transformed tokens is observed. For example, in FIG. 4A, adding the token 3' to the reference cluster 101 does not adversely affect edge density for the reference cluster 101, an in fact, may improve edge density. However, as illustrated in FIG. 4B, adding token 4' to the reference cluster 101 does adversely affect the edge density of the reference cluster 101. As a result, it can be determined that correcting a token represented by 3 to 3' is likely a reasonable data correction operation for certain situations. However, correcting a token represented by 4 to 4' is unlikely to be a reasonable data correction operation for the same situations. Note that while different tokens are illustrated here, different other embodiments may perform different transformations of the same token. Thus for example, a token 3 may be transformed to 3a' and 3b'. If 3a' causes the effects illustrated in FIG. 4A while 3b' causes the effects illustrated in 4B, the processing system 106 can determine that the transformation of 3 to 3a' is probably correct while the transformation of 3 to 3b' is likely incorrectly.

A more detailed example and description of some embodiments is now illustrated.

Consider the following table:

| ID | Country | Abbreviation |
|---|---|---|
| $r_1$ | Germany | GER |
| $r_2$ | United States | USA |
| $r_3$ | Switzerland | SUI |
| $r_4$ | Monaco | MON |
| $r_5$ | Australia | Australia |

This table illustrates an error for the abbreviation for the country Australia in the 'Abbreviation' column. In particular, the full name of the country is included in the entry in the column instead of the abbreviation. The following illustrates an automatic cleaning mechanism that can find replacement suggestions within the same column, here the 'Abbreviation' column. In particular, to suggest the correct data repair, embodiments first attempt to identify the domain.

Tabular data, such as is found on various web sites (such as for example Wikipedia), often contains implicit semantic relationships that are useful for finding 'dirty' data, that is, data having one or more errors. In the table above, column 'Country' contains full country names while column 'Abbreviation' contains ISO 3166 country codes which represent different value domains. Intuitively, if a value of a token found in column 'Abbreviation' is not a country code, it is a potentially dirty data value, because it does not occur in the same domain in the corpus of background data with the other values of tokens. This type of analysis is referred to herein as domain clustering. Two different scenarios for domain clustering are illustrated including clustering a single underlying domain and clustering a multi-domain context. For example, in a multi-domain context, if multiple data sources are integrated embodiments could determine whether a newly generated schema is consistent.

Once the outlier values have been found, embodiments identify replacement candidates for them. A good replacement is both syntactically close to the dirty value and semantically consistent with the column domain. This is illustrated in the example shown in FIGS. 2-4.

For record $r_5$ in the table above, a correct candidate suggestion would be AUS as it is the code for Australia and appears in the same domain as the other codes. The concepts associated with this are referred to herein as repair candidate generation.

Values occurring in the same column in a table should have a semantic relationship. Thus, to construct clusters, embodiments leverage the co-occurrence of values through online domain similarity specific correlation to compute domain density. Given the means to compute the correlation between sets of values rather than pair-wise correlation, embodiments then use fast agglomerative clustering techniques that build a domain clustering for those value sets that may need to be repaired. Then, embodiments extend the domain of those value sets to find candidate repairs for the outliers in the domain clustering.

Domain clustering, such as is illustrated in FIG. 2, is the task of finding a clustering C based on the semantic relationship between (clusters of) records in a record set R such that every cluster $c_i \in C$ represents a domain.

In the running example, C includes one cluster $c_1$ with four records {USA, GER, SUI, MON} and one cluster $c_2$ with one record {Australia}. Note that in this example there exists only one underlying domain for the column. In data integration, there exist use cases where multiple domains can be present in one token set, for example, whenever data is merged from multiple source systems.

After domain clustering is concluded, the system tries to find good repair suggestions for the records in c2 by examining the domain neighborhood of $c_1$. The domain neighborhood of a set of records includes all those records that are commonly associated with the same domain as the $r_i$ in the reference cluster $c_i$. In this example, with $c_i$ as the reference cluster, tokens that co-occur with either of the values are other country codes such as AUS, FRA, CAN etc. but also week days (THU, SAT etc.) because of token MON. The system therefore examines the syntactic similarity of these transformation candidates next and rejects those candidates that are not similar to the outlier token, here Australia. Whichever records remain are proposed as repair options. In the illustrated example, likely candidates are AUS and SAT which both contain letters that are a subset of Australia. Out of these two, AUS is a better candidate because it has higher domain consistency with the other column tokens.

Repair candidate generation is the problem of finding transformations for $r_j \in c_j$ such that their modified records $r'_j = \text{mod}(r_j)$ could belong to a reference cluster $c_i$.

Domain clustering and repair candidate generation both require a corpus of background data that captures the domains of records. Embodiments can generate and use a bipartite graph for this purpose as illustrated below.

Figure 5:
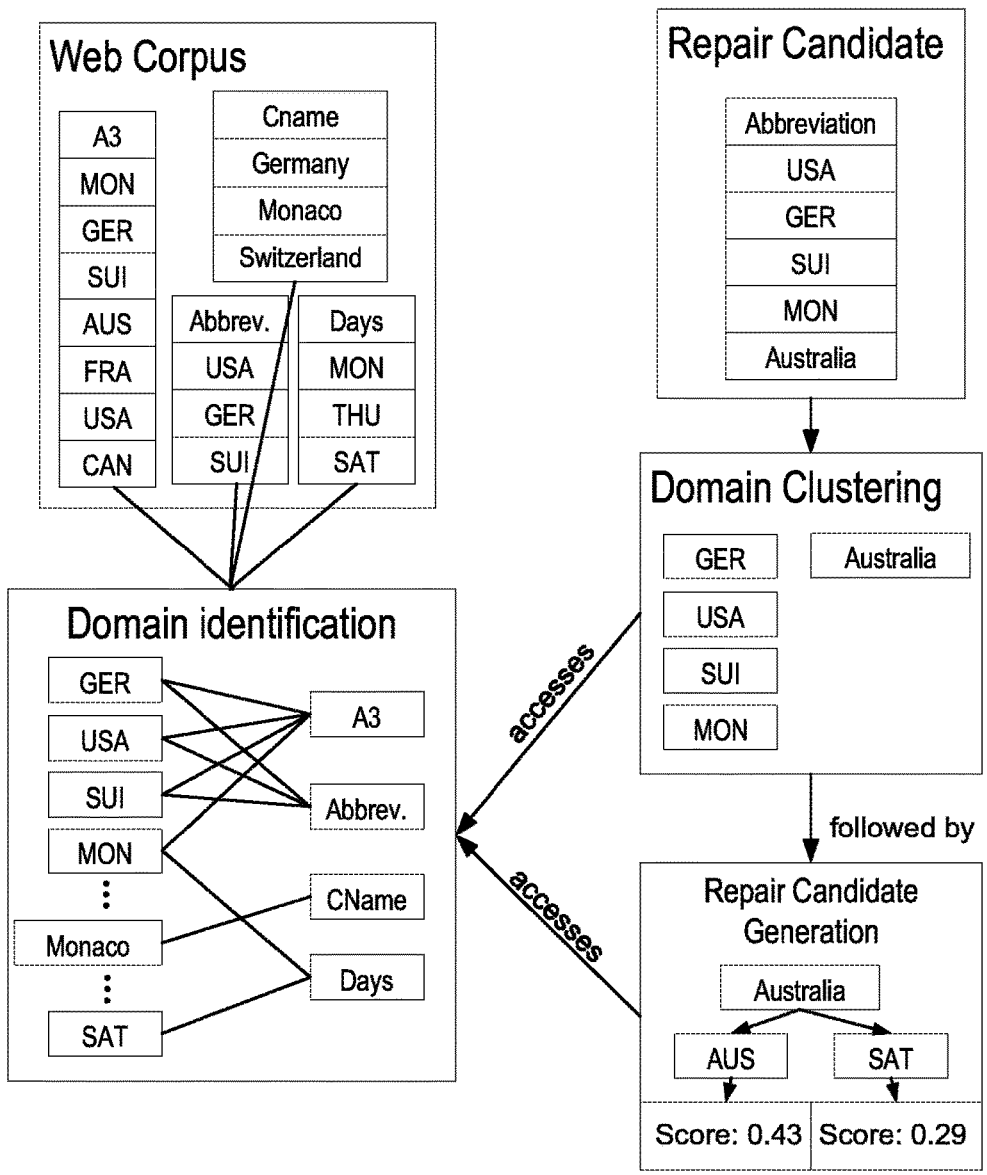
FIG. 5 illustrates a bipartite graph.

To enable data repair suggestions based on domains, the system 106 first needs to find possible domains in a domain identification step. These domains could be precomputed on a corpus of background data. Alternatively or additionally these domains could be identified by observing data collected from different data sources such as web tables and interpreting the data online. As shown in FIG. 5, a bipartite graph $G=(U, V, E)$ 502 is constructed from the input columns of the table illustrated above. The two partitions of the graph are tokens (U), which are the abstraction from single values, and column ids (V). There exists an edge connecting a token $u_i \in U$ with a column id $v_j \in V$ if the token is observed in $v_j$. If there exist two tokens $u_i$ and $u_k$ that have an edge to $v_j$, this is evidence that they belong to the same domain. Exact measures for computing domain are illustrated in more detail below. However, for now it suffices to say that the bipartite graph 502 provides means to compute the similarity of a set of tokens.

This online similarity computation is used for both domain clustering and repair candidate generation. The system 106 needs to estimate the cohesiveness of a set of tokens for domain clustering and then adjust C accordingly. Suggestion generation requires mechanisms to compute the domain neighborhood of values. Embodiments achieve domain extension by using the bidirectional edges in the knowledge graph. They tell the algorithms which records occur in the same columns and are thus potential repair candidates.

Domain identification involves finding domains, i.e., semantic sets of tokens, such that there is high correlation between each pair of tokens within a domain.

As described above, embodiments perform a domain computation on a bipartite graph that captures the relationships between tokens $u_i$ and data sources $v_j$ such as columns in web tables. While embodiments may use a cluster representation instead, the bipartite graph representation may be chosen for a number of different reasons including similarity computation flexibility and suggestion inference.

With respect to similarity computation flexibility, as embodiments may not know the domains of tokens before the domain clustering phase, such embodiments may require the similarity computation for domains to be flexible. That is, these embodiments cannot make any assumptions of which records will be mentioned in the repair tokens, i.e., the input to the system 106 which the user wants to repair. Thus, the system 106 should be able to compute the similarity on the fly based on the knowledge about token-column-mappings that has been observed previously.

Figure 6A:
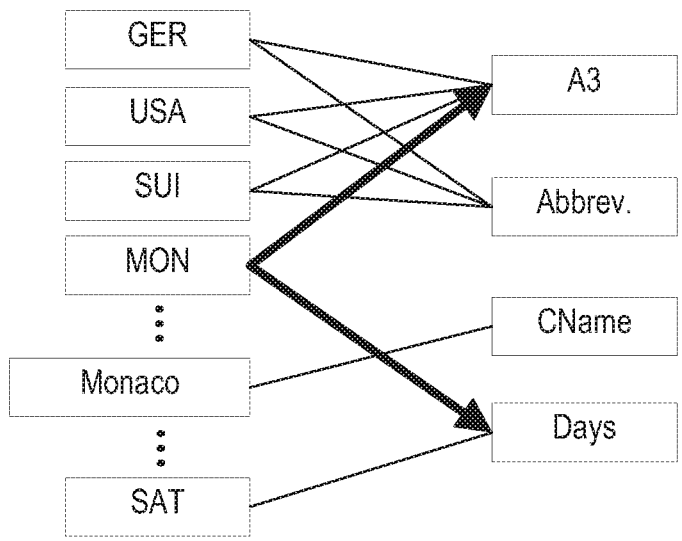
FIG. 6A illustrates exploration of edges for the bipartite graph.
Figure 6B:
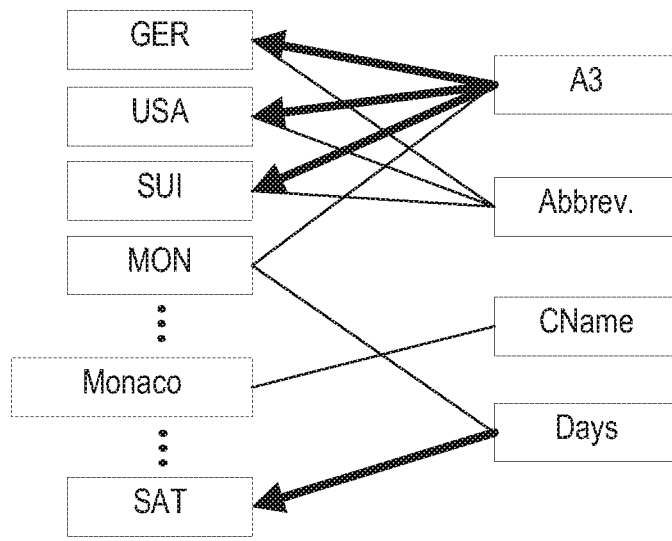
FIG. 6B further illustrates exploration of edges for the bipartite graph.

With respect to suggestion inference. To obtain data repair candidates, embodiments need a data structure that helps explore candidates that are in the same domain as the reference tokens and which are syntactically similar to the outliers. Using the bipartite graph, embodiments can intuitively exploit its bidirectional edges for that purpose. For example, if embodiments want to find tokens that are indirectly connected to MON as illustrated in FIG. 6A, embodiments first find those columns in which MON can be observed. These columns are A3 and Days. In the second step, embodiments can examine the neighborhood of these columns to extract the repair candidates GER, USA, SUI, and SAT amongst others, as illustrated in FIG. 6B.

As an alternative to the bipartite graph, embodiments may use graph solutions with in-memory storage of pair-wise similarities for all tokens. This guarantees fast access time during the online execution. However, it may have high storage requirements.

Figure 7A:
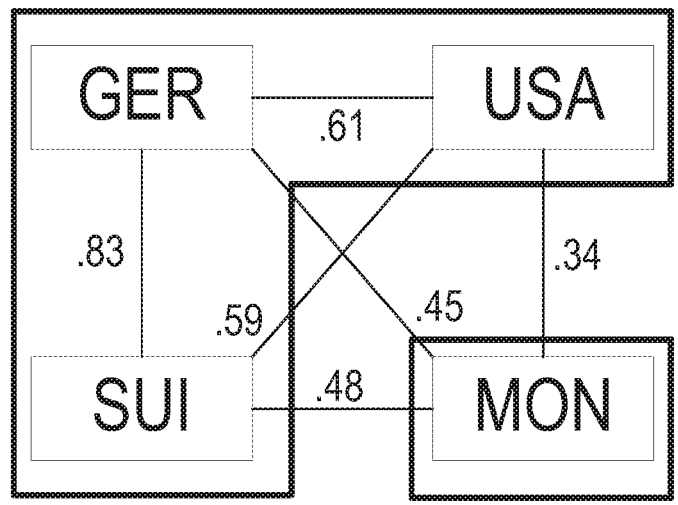
FIG. 7A illustrates pointwise mutual information metrics.

The term domain similarity describes the semantic relation-ships of a set of tokens. As used herein, embodiments use domain similarity to estimate the 'goodness' of a domain. In the running example, embodiments need to establish whether tokens GER, USA, SUI, and MON belong to the same domain. Using pair-wise similarity, embodiments compute the similarity between each pair of tokens using point wise mutual information (PMI) as shown in FIG. 7A. The PMI metric is defined as follows.

$$PMI(r_i, r_j) = \log \frac{p(r_i, r_j)}{p(r_i)p(r_j)}$$

To make the PMI of several token pairs comparable, embodiments use the normalized PMI (NPMI).

$$NPMI(r_i, r_j) = \frac{PMI(r_i, r_j)}{-\log(p(r_i, r_j))}$$

Basically, the NPMI maps the similarity of two records $r_i$ and $r_j$ to $[-1,1]$. If $NPMI(r_i;r_j)=1$ then $r_i$ appears only in conjunction with $r_j$ and vice versa. If $NPMI(r_i;r_j)=-1$ then $r_i$ and $r_j$ can never be found in the same column. Last, the NPMI accounts for randomness, i.e., if $NPMI(r_i;r_j)=0$ then $r_i$ and $r_j$ appear independently of each other but there may exist co-occurrences of both values. The likelihood of $r_i$ and $r_j$ appearing in the same column, $p(r_i;r_j)$, is computed by intersecting the columns in which $r_i$ and $r_j$ occur and normalizing the score with respect to the total corpus of background data. If $V_i$ are those columns that $r_i$ maps to and $V_j$ the column ids corresponding to $r_j$ then $$p(r_i, r_j) = \frac{|V_i \cap V_j|}{|V|}$$

For example, in FIG. 7A the NPMI leads to similarities that all are above 0, i.e., the tokens are all somewhat correlated, but embodiments identify differences in the co-occurrence scores of values. Specifically, embodiments identify that MON is not as well-connected as all other three values: It is connected to SUI with NMPI(MON,SUI)=0.48 which is the best score connecting MON to any other token. In contrast, the worst similarity score between the other three tokens is 0.59 for pair (SUI, USA).

The reason for the discrepancy observed in the example is that token MON is ambiguous: It means 'Monaco' in the standardized ISO code but it may also stand for 'Monday' if used as an abbreviation for the weekday. Using a clustering mechanism (for example correlation clustering or average link) on top of the similarity graph would thus result in a clustering where MON is assigned to a singleton cluster. From this example, embodiments can determine how pair-wise similarities distort domain similarity. They cannot accurately capture the relationships of domains because they are inherently based on pairs. To address this problem, some embodiments may use a novel clustering metric called normalized specific correlation which estimates the similarity of domains instead of pairs.

To compute domain similarity, embodiments use an extended version of PMI called specific correlation. It is formally defined as follows.

$$SC(r_1; \ldots ; r_n) = \log \frac{p(r_1; \ldots ; r_n)}{\prod_{i=1}^{n} p(r_i)}$$

It characterizes the similarity score of a set of tokens through the ratio of their co-occurrence likelihood $p(r_1; \ldots ; r_n)$ to the occurrences of each token separately. Similarly to the PMI metric, embodiments normalize its score to obtain comparable results for different cluster sizes. Thus, the normalized SC (NSC) computes the SC score in relation to the number of tokens in the cluster and their cluster co-occurrence.

$$NSC(r_1; \ldots ; r_n) = \frac{SC(r_1; \ldots ; r_n)}{(1-n)\log(p(r_1; \ldots ; r_n))}$$

This normalization projects the original SC score into $$\left[\frac{1}{1-n}\right], 1$$

Analogous to the NPMI metric, if $NSC(r_1; \ldots ; r_n)=0$ holds, the co-occurrence between all tokens in the domain is random. The interaction between a group of tokens rather than a pair is also the reason why the lower bound of the normalization space shifts with different domain sizes although the point of independence (NSC=0) is still observed. Therefore, it can be used for the comparison of scores if they lie in [0,1].

Figure 7B:
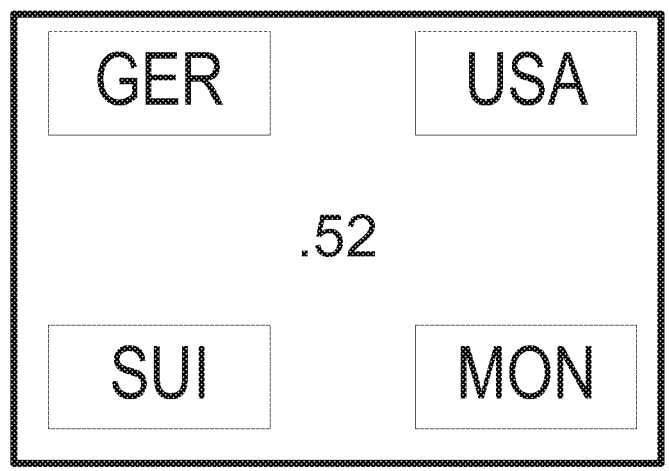
FIG. 7B illustrates a normalized domain similarity metric.

In general, not every token occurs equivalently. A running example is taken from a web corpus dataset in which USA appears in 187,996 different columns and MON only appears in 7,195 different columns. They co-occur in 495 different columns which is a relatively small number and the reason why the NSC of this pair is only 0.34. If embodiments extend the pair to (USA, MON, GER) there are 242 co-occurrences and adding SUI leads to a reduction to 163 column ids. The absolute reduction of column ids is not as high as expected (i.e., as if they were as correlated as before) which leads to an increase of the NSC from 0.34 to 0.46 and finally 0.52 (see FIG. 7B).

Domain clustering is the task of finding the underlying domain-token relationship of a set of repair tokens R. Every cluster $c_i$ in the output clustering C that this technique produces represents a domain. Commonly, repair sets contain one dominant domain as values are usually consistent within table columns. Domain diversity may change if the repair set is derived from multiple data sources that are not standardized similarly. For example, imagine a data integration scenario where one data source used the full state names and the second data source its abbreviations. The following illustrates domain clustering for both use cases through optimal and greedy strategies.

An optimal domain clustering under the assumption of a single domain includes one cluster with multiple records and potentially multiple singleton clusters, i.e., clusters that contain only one record. The bigger cluster contains the dominant domain for this set of tokens while the singleton clusters contain outliers to that domain. To differentiate between multiple candidate clusterings that fulfill this structural condition, embodiments term the best clustering the one with the largest consistent cluster and the highest NSC score. A consistent cluster in this context refers to a cluster $c_i$ for which holds that any cluster $c_j \subset c_i$ does not have a higher NSC than $c_i$. The reasoning behind this constraint is that a lower NSC score means a diffusion of the cluster consistency. Furthermore, by picking a maximal $c_i$, embodiments ensure that that the most suitable domain is found underlying the repair set.

The following illustrates one definition for optimal single-domain clustering. Let C be a domain clustering with one cluster $c_i \in C$ that contains $k \geq 1$ records and n−k singleton clusters $c_j$. C is consistent if there exists no $c_j \subset c_i$ for which $NSC(c_j) > NSC(c_i)$ and there exists no $c_j$ such that $NSC(c_i, c_j) > \max[NSC(c_i), NSC(c_j)]$. For C to become the best domain clustering $C^*$, there cannot exist an alternative clustering C' for which $|c'_i| > |c_i|$ or $NSC(c'_i) > NSC(c_i)$ holds.

For multiple domains, and analogous to single-domain clustering, consistency is attempted as it ensures that the clusters are semantically cohesive. In this type of domain clustering, multiple clusters form C. To determine valid solutions to the multi-domain clustering problem, embodiments extend the notion of optimal single-domain clustering as follows: C may contain multiple clusters $c_i$ for which $|c_i| > 1$ and the consistency constraint described above holds. In practice, this definition of an optimal multi-domain clustering may again lead to multiple candidate clusterings. Embodiments may thus impose one more constraint on the best optimal clustering $C^*$. A clustering C is $C^*$ if it is optimal and its biggest cluster $c_i \in C$ is bigger than any cluster $c_j$ in any of the other candidate clusterings. Domain clustering is to find outliers in the repair token set even if it has multiple underlying domains. This construction of $C^*$ therefore guarantees that embodiments examine the clustering with the biggest consistent domain. Note that this is only one variation which is the most applicable for a use cases. It can be adapted to other scenarios if required.

Finding $C^*$ is often infeasible in practice. The reason is that to compute it, the system 106 would need to generate all permutations of candidate clusterings, evaluate their consistency, and finally order them according to their cluster sizes. To approximate $C^*$, a greedy version for the optimal clustering problem can be used. The following algorithm describes GREEDYOPT, a greedy algorithm that solves optimal multi-domain clustering, in pseudo code.

```
Input  : Repair Tokens R; Bipartite Graph G = (U, V, E)
Output : Domain Clustering C
1 C ← CreateSingletonClusters(R)
2 Q ← C .ClusterIDs
3 while¬ Q.empty do
4     c_i ← Q.PollRandom( )
5     foreach c_j ∈ Q do
6         if G.NSC(c_i ,c_j ) ¿ max[G.N SC (c_k), G.N SC (c_j)]
          then
7             C .Merge(c_i ,c_j)
8             Q.ResetTo(C .ClusterIDs)
9             Jump to Line 3
```

The algorithm takes as input the repair set R as well as a bipartite graph G=(U, V, E). It initializes the output domain clustering C with singleton clusters, i.e., every token is assigned its own cluster. It then proceeds iteratively: First, the algorithm picks a cluster ci at random. It then examines all other remaining clusters $c_j$ in the queue and computes their NSC scores. If the combined NSC score of $c_i$ and $c_j$ exceeds their single scores, then embodiments have found a domain that is more consistent together than apart (Line 6). Thus, $c_i$ and $c_j$ are merged and the queue is reset (Lines 7 and 8) after which the algorithm jumps back to the beginning of the loop (Line 3). Note that this algorithm is designed for multi-domain clustering. However, it can be easily transformed to optimal single-domain clustering by modifying Line 4 to pick the largest cluster instead of a random cluster.

Even though GREEDYOPT algorithm is a good approximation for finding the optimal domain cluster problem, it may not function well in many real world environments with real world datasets as these datasets are noisy. Recall that the condition under which embodiments consider a merge of two (singleton) clusters: Their combined NSC has to outweigh the individual NSC scores. Monotonicity is only guaranteed if adding any new token to the domain strengthens the domain which is often not the case in datasets with errors. Amongst others, tokens such as MON can point to multiple domains, there may be tokens that are misspelled and thus distort the domains etc. As a result, GREEDYOPT may fall into local optima which it cannot recover from. Embodiments may therefore use the notion of a similarity threshold $\alpha$. Tokens are considered to belong to the same domain if $\alpha$ is exceeded. Formally, the best approximation in a threshold-based setup is characterized as follows.

The best approximate clustering C* contains a cluster $c_i \in C^*$ for which $NSC(c_i)$ exceeds $\alpha$ and $c_i$ is maximal, i.e., there exists no C' for which $|c'|>|c_i|$ or $NSC(c')>NSC(c_i)$ holds.

Analogous to optimal multi-domain clustering, approximate multi-domain clustering extends the above definition by allowing for multiple multi-token sets in the domain clustering.

The following illustrates details with respect to greedy approximate domain clustering. Similar to finding the optimal domain clustering, embodiments can find C* if all clusterings are examined and then the appropriate one is chosen. As the computational effort for large repair sets is too high, a greedy version can be used to solve this problem analogous to the previously presented GREEDYOPT algorithm. For the GREEDYAPPROX algorithm, Line 6 in Algorithm 1 is modified such that if G.N SC $(c_i, c_j) > \alpha$ holds, the merge of $c_i$ and $c_j$ is triggered. This approach is very efficient but is prone to local optima because of its merge decision order. To resolve situations where clusters are merged that barely exceed $\alpha$ first, a second approximation referred to herein as GREEDYAPPROXTIGHT that builds upon GREEDYAPPROX may be used. It is a two-threshold version of GREEDYAPPROX and prioritizes merge decisions for which G.N SC $(c_i, c_j) > (1-\alpha)/2+\alpha$ holds. In words, it artificially tightens the acceptance threshold when it decides whether to merge two clusters. If no merge decision is found for this tighter threshold, it falls back on the decision function of GREEDYAPPROX.

A general concern for a threshold-based domain clustering is the choice of $\alpha$. Thus, some embodiments use a sample of the dataset and vary the threshold to find a suitable $\alpha$.

The following now illustrates details with respect to repair candidate generation. Embodiments can leverage the domain information found in the previous steps and suggest repairs to the end users. In general, embodiments can differentiate between two types of data repairs:

Syntactic Data Repairs. This type of a repair is applied, for example, when the original value is misspelled, for example 'Grgia' is repaired to 'Georgia', or has a transformation function such as capital(Georgia)=Atlanta or abbreviation(Georgia)=GA.

Semantic Data Repairs. These are conceptual repair decisions for a value. For example, if the repair occurs in a column of state capitals, a repair of 'Georgia' to 'Atlanta' is more likely than the transformation into 'GA'.

Syntactic repairs are usually accomplished by using mechanisms such as string similarity or edit distance or applying low cost transformation functions. Note that these transformation functions alone only generate candidates from the repair token, they cannot determine whether this repair suggestion is a good suggestion. However, this is a strength of semantic repairs that require contextual data. Combining these two types of repairs can be used to a) generate suitable candidate repair tokens and b) evaluate the suitability of these candidates given the current context.

To generate candidate repairs, embodiments first exploit the characteristics of the underlying data structure that are being used. The bidirectional edges between tokens and observed sets, or columns, in the bipartite graph can be used to find similar tokens to the current one. Embodiments use this methodology to expand the domain of a cluster $c_i$ that can serve as a reference cluster as shown in the following pseudo code algorithm:

```
Input  : Domain Clustering C ; Bipartite Graph
         G = (U, V, E)
Output : Suggestion Set L
1  V ← ø
2  foreach c_i ∈ C, |c_i| > 1 do
3      foreach r_i ∈ c_i do
4          V.Add(MapC olumn(r_i))
5      L ← ø
6      foreach v_k ∈ V do
7          L.Add(MapT oken(v_k))
8      foreach c_j ∈ C, |c_j| = 1 do
9          Filter(L, c_j )
10         Rank(L, c_j )
```

That is, embodiments first find the transitive closure $V_i$ of all tokens $r_i \in c_i$, i.e., those columns $v_i$ that map to any $r_i$ (Line 4). In the second step embodiments then use the token mapping functionality of the columns and retrieve the candidate values $U_i$ that co-occur with any $r_i$ (Line 7). As a result, embodiments now have all candidate tokens that co-occur with the reference domain cluster. These are the tokens that outliers may be transformed into using syntactic data repair methodologies. In Line 9 embodiments therefore filter all tokens from $U_i$ that are not a match for a syntactic repair with any outlier cluster $c_j$. Last, the remaining tokens are ranked according to their likelihood of being the correct repair for this singleton cluster $c_j$ with respect to the reference cluster ci (Line 10). This is equivalent to applying semantic data repair. The rank of a candidate repair is dependent on the repair token as well as the applied semantic similarity metric such as NSC or NPMI.

Going back to the running example, extending the domain of MON returns all values in columns 'A3' and 'Days'. All tokens except for AUS and SAT are removed from the list of candidate suggestions as they do not have a sufficient syntactic relationship with the original outlier Australia. As both AUS and SAT are character subsets of Australia, an algorithm examines them more closely and computes their score. The NSC score for adding AUS to the cluster of {GER, USA, SUI, and MON} is substantially higher than for SAT: $NSC(c_1,AUS)=0.43$ while $NSC(c_1,SAT)=0.29$ which is the reason it becomes the primary suggestion for data repair.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
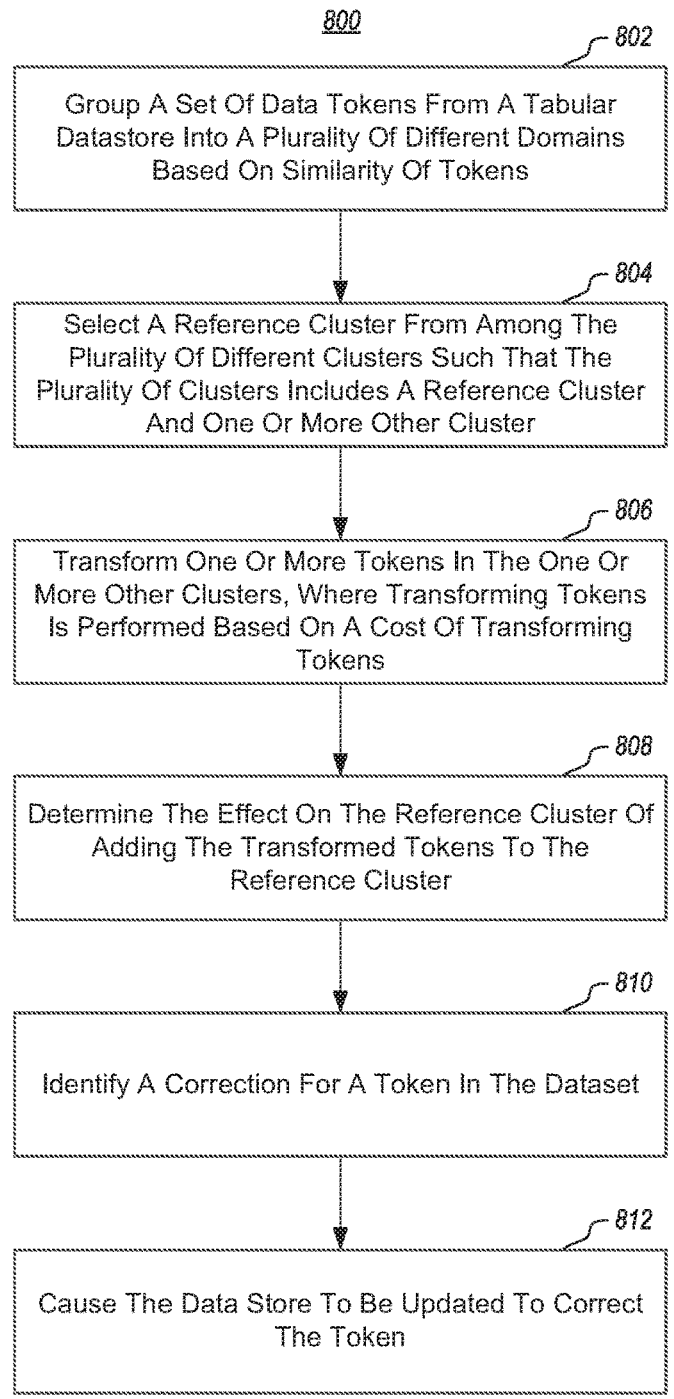
FIG. 8 illustrates a method of correcting data.

Referring now to FIG. 8, a method 800 is illustrated. The method 800 is a computer implemented method of correcting data in a dataset. The method 800 grouping a set of data tokens from a tabular data store into a plurality of different clusters based on similarity of tokens (act 802). For example, the tokens may be grouped into clusters by graph node edge density.

The method 800 further includes selecting a reference cluster from among the plurality of different clusters such that the plurality of clusters includes a reference cluster and one or more other clusters (act 804). In some embodiments, the reference cluster is the largest domain. In these embodiments, the domain sizes are compared based on the number of tokens in each of the clusters, and the largest domain is selected as the reference cluster. In an alternative or additional embodiment, a representation of the clusters can be provided in a graphical user interface, and selecting a reference cluster can be performed in response to a user identification of a domain represented in the graphical user interface.

The method 800 further includes transforming one or more tokens in the one or more other clusters, where transforming tokens is performed based on a cost of transforming tokens (act 806). For example, tokens may be transformed to try and make them suitable for the reference cluster. Various cost factors will be discussed in more detail below.

The method 800 further includes determining the effect on the reference cluster of adding the transformed tokens to the reference cluster (act 808). For example, as illustrated in FIGS. 3 and 4, the transformed tokens may be added to the reference cluster to see what effect the transformed token has on the domain.

The method 800 further includes, as a result, identifying a correction for a token in the dataset (act 810). If the transformed token has a sufficiently deleterious effect on domain density, it can be determined that the transformation of the transformed token is likely not a valid correction of the original token. If the transformed token does not have a sufficiently deleterious effect, or has a positive effect on domain density, the transformation may be determined to be an appropriate correction to the original token.

The method 800 further includes causing the data store to be updated to correct the token. In particular, an identified correction can be applied to elements in the data store.

The method 800 may be performed where the acts are iteratively performed to identify different possible corrections. Alternatively, or additionally, embodiments could identify different reference clusters. Alternatively, embodiments could perform iterative transformations of tokens.

The method 800 may further include automatically selecting an optimal correction. Thus, for example, some embodiments may simply auto-correct data.

The method 800 may further include receiving user input selecting a correction from a set of corrections. For example, a plurality of corrections may be provided to a user in a user interface. The user could then select a desired correction from among the provided corrections. For example, the method 800 may further include receiving user input at a user input, (e.g., hovering over a token presented in the user interface) and as a result providing a list of possible corrections.

The method 800 may be performed where user input at a user interface is used to select the reference cluster. Thus, for example, a user may be presented in a user interface with an indication of the different clusters. The user could indicate a preference in the user interface. The system 106 would then select the reference cluster based on the user preference.

The method 800 may be performed where the cost is based on the cost of transforming an individual token in a domain.

The method 800 may be practiced where the cost is determined based on evaluating corpus of background data. For example, various sources of tabular data may be evaluated. A computation can be performed to determine how similar a token transformation is to a data item in a domain of a corpus of background data.

The method 800 may be performed where the cost is based on the cost of transforming all tokens in a particular domain using a particular transform. For example, a determination can be made to determine how expensive, in terms of computing processing, it would be to convert a set of abbreviations to state names.

The method 800 may be performed where the cost is based on syntactical costs.

The method 800 may be performed where the cost is based on a distance between a token and a correction, for example, a Levenshtein distance.

The method 800 may be performed where the cost is based on observed correction made over time. For example, over time certain corrections may be made. Those corrections may be associated with some factor that causes the corrections to be particularly trustworthy. For example, the correction may be manually made. This could increase confidence that the correction is correct and lower an uncertainty cost factor.

The method 800 may be performed where the cost is based on correction inertia. Thus for example, if certain tokens often have a particular correction applied, this points towards this correction as being correct. This lowers an uncertainty cost with respect to making the correction.

The method 800 may be performed where the cost is based on an authoritative rank. Thus, often a corpus of background data is used to determine corrections. Some background data may be more authoritative that other background data. Thus, for example, embodiments may compare Wikipedia vs. Webster as having different authoritative ranks. Alternatively, background data from a data steward (e.g., a system administrator) may have a higher authoritative rank than background data from a user.

The method 800 may be performed where grouping a set of data tokens from a tabular data store includes using point-wise mutual information computed by collecting column-wise co-occurrence statistics of data items in a corpus of structured data to perform user data item clustering and outlier detection.

The method 800 may be performed where transforming one or more tokens in the one or more other clusters comprises using row-wise point-wise mutual co-occurrence statistics collected over a corpus to rank and score data transformations between data items or clusters.

The method 800 may be performed where grouping a set of data tokens from a tabular data store comprises using higher-order co-occurrence statistics to perform user data item clustering and outlier detection. For example, information about how often data items co-occur in the same column and/or row may be used to group data token.

The method 800 may be performed where transforming one or more tokens in the one or more other clusters comprises using higher-order co-occurrence statistics to rank and score data transformations or corrections between data items or clusters. For example, information about how often data items co-occur in the same column and/or row may be used to transform or correct tokens.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defied as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable media having stored thereon instructions that are executable by the one or more processors to configure the computer system to correct data in a dataset, including instructions that are executable to configure the computer system to perform at least the following acts:
group a set of data tokens from a tabular data store into a plurality of different clusters based on similarity of tokens;
select a reference cluster from among the plurality of different clusters such that the plurality of clusters includes a reference cluster and one or more other clusters;

transform one or more tokens in the one or more other clusters, where transforming tokens is performed based on a cost of transforming tokens;

determine the effect on the reference cluster of adding the transformed tokens to the reference cluster;

as a result, identify a correction for a token in the dataset; and cause the data store to be updated to correct the token.

2. The computer system of claim 1, wherein the acts are iteratively performed to identify different possible corrections.

3. The computer system of claim 1, wherein user input at a user interface is used to select the reference cluster.

4. The computer system of claim 1, wherein the cost is based on the cost of transforming an individual token in a domain.

5. The computer system of claim 1, wherein cost is determined based on evaluating a corpus of background data.

6. The computer system of claim 1, wherein the cost is based on the cost of transforming all tokens in a particular domain using a particular transform.

7. The computer system of claim 1, wherein the cost is based on syntactical costs.

8. The computer system of claim 1, wherein the cost is based on a distance between a token and a correction.

9. The computer system of claim 1, wherein the cost is based on observed correction made over time.

10. The computer system of claim 1, wherein the cost is based on correction inertia.

11. The computer system of claim 1, wherein the cost is based on an authoritative rank.

12. The computer system of claim 1, wherein grouping a set of data tokens from a tabular data store comprises using point-wise mutual information computed by collecting column-wise co-occurrence statistics of data items in a corpus of structured data to perform user data item clustering and outlier detection.

13. The computer system of claim 1, wherein transforming one or more tokens in the one or more other clusters comprises using row-wise point-wise mutual co-occurrence statistics collected over a corpus to rank and score data transformations between data items or clusters.

14. The computer system of claim 1, wherein grouping a set of data tokens from a tabular data store comprises using higher-order co-occurrence statistics to perform user data item clustering and outlier detection.

15. The computer system of claim 1, wherein transforming one or more tokens in the one or more other clusters comprises using higher-order co-occurrence statistics to rank and score data transformations or corrections between data items or clusters.

16. A computer implemented method of correcting data in a dataset, the method comprising:

grouping a set of data tokens from a tabular data store into a plurality of different clusters based on similarity of tokens;

selecting a reference cluster from among the plurality of different clusters such that the plurality of clusters includes a reference cluster and one or more other clusters;

transforming one or more tokens in the one or more other clusters, where transforming tokens is performed based on a cost of transforming tokens;

determining the effect on the reference cluster of adding the transformed tokens to the reference cluster;

as a result, identifying a correction for a token in the dataset; and causing the data store to be updated to correct the token.

17. The method of claim 16, wherein cost is determined based on evaluating a corpus of background data.

18. The method of claim 16, wherein the cost is based on the cost of transforming all tokens in a particular domain using a particular transform.

19. The method of claim 16, wherein the cost is based on syntactical costs.

20. A computer-readable medium having stored thereon instructions that are executable by one or more processors to configure a computer system to correct data in a dataset, including instructions that are executable to configure the computer system to perform at least the following acts:

group a set of data tokens from a tabular data store into a plurality of different clusters based on similarity of tokens;

select a reference cluster from among the plurality of different clusters such that the plurality of clusters includes a reference cluster and one or more other clusters;

transform one or more tokens in the one or more other clusters, where transforming tokens is performed based on a cost of transforming tokens;

determine the effect on the reference cluster of adding the transformed tokens to the reference cluster;

as a result, identify a correction for a token in the dataset; and cause the data store to be updated to correct the token.

* * * * *